INVENTOR
Andrew Stratienko

BY

Paul + Paul
ATTORNEYS.

United States Patent Office 3,536,302
Patented Oct. 27, 1970

3,536,302
BEARING LUBRICATION FOR MIXER SHAFT
Andrew Stratienko, Wyndmoor, Pa., assignor to King of Prussia Research and Development Corporation, King of Prussia, Pa., a corporation of Pennsylvania
Filed Nov. 21, 1968, Ser. No. 777,657
Int. Cl. B01f 7/16
U.S. Cl. 259—108                                    12 Claims

ABSTRACT OF THE DISCLOSURE

In a mixer tank having a vertical impeller shaft which extends down into the tank, two spaced-apart bearings support the shaft above the tank against radial loads. A stuffing-box seal embraces the shaft and is located sufficiently below the lower bearing to allow room to remove the packing of the stuffing box. A third radial-load bearing is located just below the stuffing box packing. The third bearing is supported in a housing secured to the tank mounting flange. An oil reservoir is provided for maintaining the third bearing lubricated. Bypass means equalize the internal tank pressure on the oil reservoir. A lubrication supply is also provided for the stuffing-box packing.

BACKGROUND OF THE INVENTION

As is well known, the function of a stuffing box is to seal against and to prevent leakage of liquid or gas from a pump chamber, or from a mixer tank, or other vessel. In the case of a motor driven pump, where the function of the stuffing box is to prevent leakage of liquid or gas from the pump chamber, a flexible coupling usually couples the motor to the pump, and the stuffing box is customarily mounted close to a bearing and due to its closeness to the bearing the pump shaft has little or no radial load imposed upon it, and, as a consequence, there is little or no shaft deflection, and the center line of rotation of the pump shaft remains fixed. As a result there is little wear on the packing of the stuffing box, and the oil film which is provided between the packing and the shaft is substantially free of leakage.

A substantially different situation exists, however, in the case of mixer tanks of the vertical type. Here, the bearing and the stuffing-box are customarily spaced far apart in order to allow room to remove the packing. Since, in many cases, the impeller shaft is a long shaft which extends well down into the tank with the impeller mounted at or near the lower end of the long shaft, a large radial load is imposed upon the shaft and due to the resultant shaft deflection, the oil film at the packing tends to leak down and the stuffing box tends to run dry. As a result, heat is generated at the stuffing box and additional power or energy is required to drive the mixer shaft rotationally through the dry hot stuffing box. Despite these difficulties, stuffing boxes have continued to be used in vertical mixers because they are necessary for the maintenance of pressure in the tank. In many cases, high pressure within the tank is an important requirement, being needed in order to maintain the mix in a liquid phase as distinguished from the gaseous phase.

SUMMARY OF THE PRESENT INVENTION

The object of the present invention is to overcome the difficulties indicated above and to provide the shaft of a vertical mixer with a stuffing box seal which continues to be lubricated and which does not run dry and which as a consequence requires a minimum of maintenance. In accordance with the present invention, a third bearing is provided just below the stuffing-box packing for supporting the shaft against radial loads. The third bearing is provided with oil from an oil reservoir so designed that high pressures within the mixer tank are equalized relative to the oil reservoir.

DESCRIPTION OF THE PREFERRED EMBODIMENT

Figure 1:
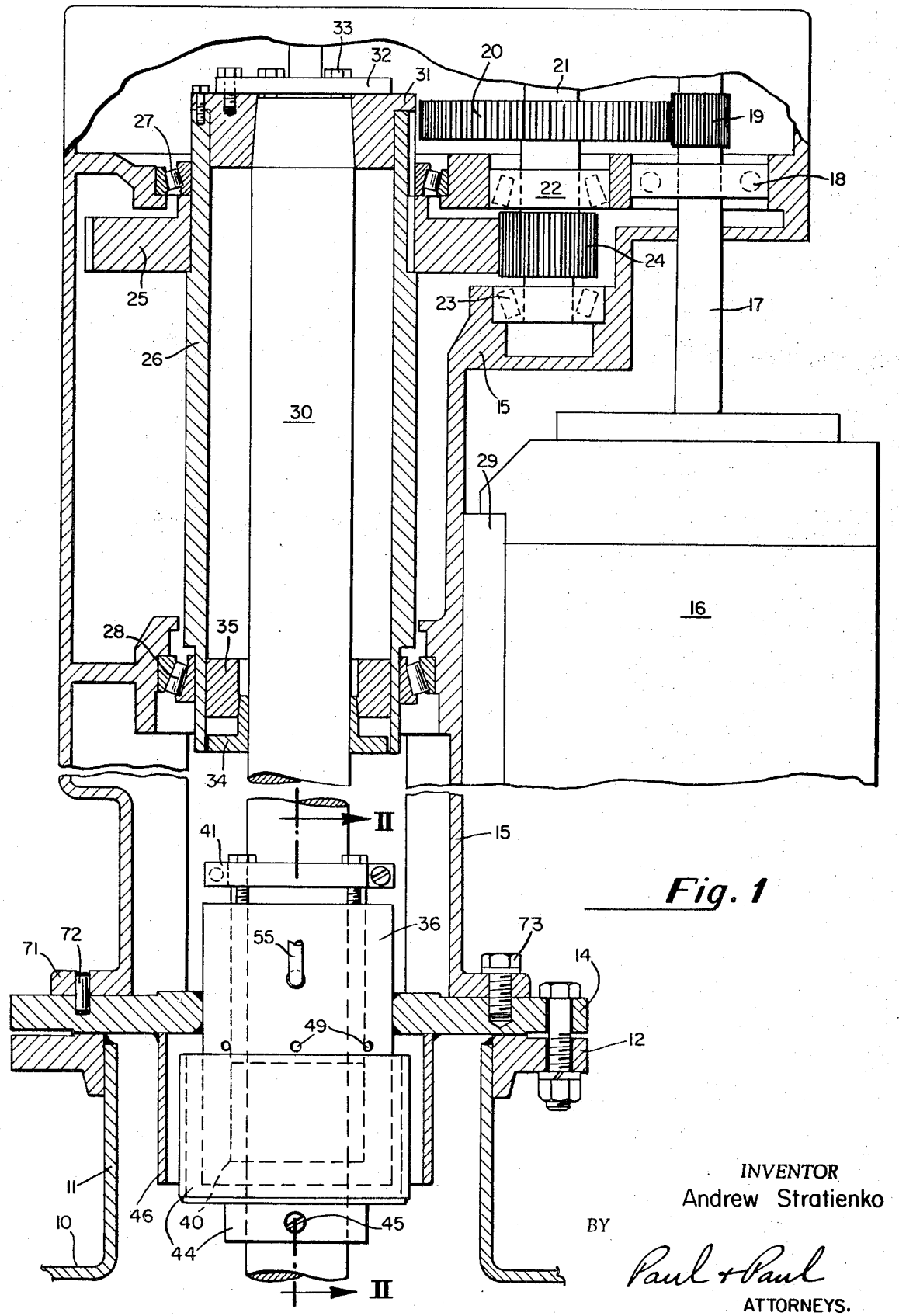
FIG. 1 is an elevational view, mostly in section, showing a vertical top-entering mixer and showing the third-bearing housing and the oil reservoir which provides lubrication for the bearing.

In FIG. 1, the reference numeral 10 identifies the top of a top-entering mixer tank having extending upwardly therefrom a tank nozzle 11. Secured to the tank nozzle 11, as by welding, is a tank flange 12 to which is bolted a mounting flange 14. Supported on mounted flange 14 is motor-drive housing 15 for the impeller shaft 30. Included within the housing 15, in a laterally extending portion thereof, is a gear reduction unit driven by a motor 16 mounted on an adapter plate 29 secured to the side of the housing 15.

The motor drive shaft 17, supported for rotation by a ball bearing assembly 18, drives a high-speed pinion 19 which meshes with and drives a change gear 20 which is mounted on and secured to a low-speed pinion shaft 21. Shaft 21 is supported, as by roller bearing assemblies 22 and 23, in the laterally-extending portion of the motor-drive housing 15. Secured to the shaft 21 is a low-speed pinion 24 which meshes with and drives a low-speed gear 25 which surrounds and is keyed to a hollow tube or quill 26. Quill 26 is supported for rotation in the motor-drive housing 15 as by an upper roller bearing assembly 27 and a lower roller bearing assembly 28. Secured to the upper end of the quill 26, as by bolts, is an adapter 31 having a cap plate 32 bolted thereto. The cap plate 32 supports, as by bolts 33, the impeller drive shaft 30. By such means, the shaft 30 is secured to the quill 26. Shaft 30 is thus rotatable with the quill 26. The shaft 30 extends down through a sleeve 34 and a wedge 35. These members 34 and 35 provide the shaft 30 with lateral support at the level of the lower roller bearing 28.

Figure 2:
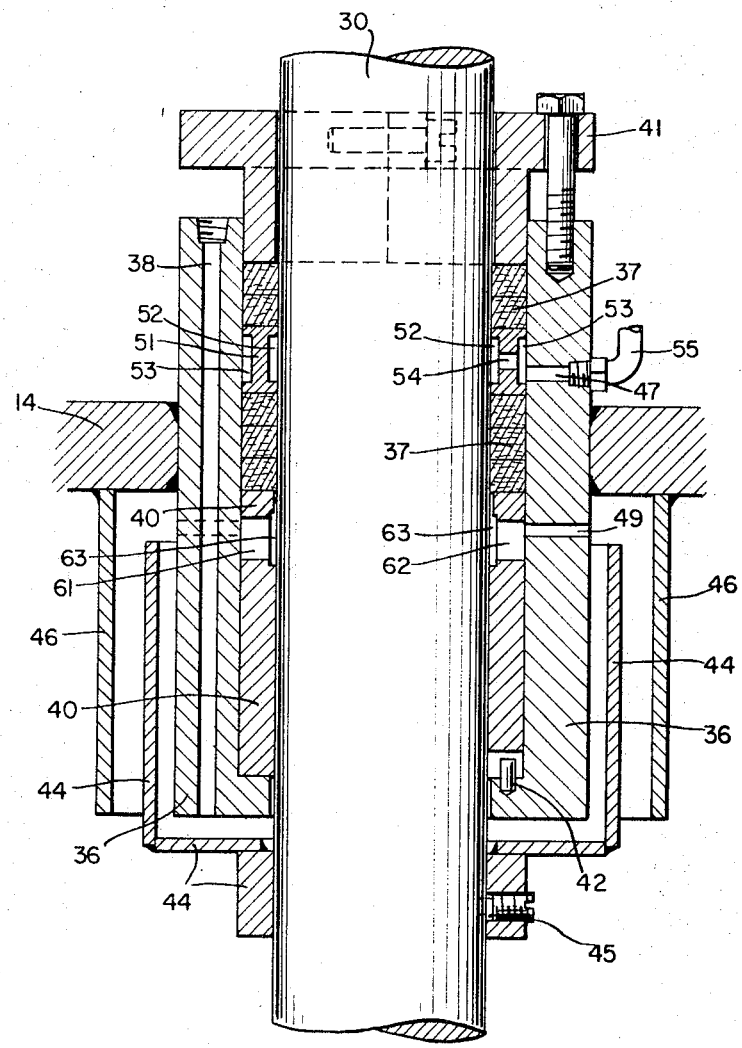
FIG. 2 is a detailed view of the stuffing box and third bearing as seen looking along the line II—II of FIG. 1.

Below the lateral support members 34 and 35, the shaft 30 extends through an area of sufficient length to allow a maintenance workman to remove the stuffing box for replacement of the packing. As seen in FIGS. 1 and 2, the packing 37 is held retained in a stuffing box or housing by a gland 41, which is split to allow removal thereof from the shaft 30.

The structure so far described is known in the prior art. Since the impeller shaft 30 ordinarily extends down into the mixer tank a considerable distance below the lateral support at the lower bearing assembly 28, and since the impeller (or at least one of the impellers) is ordinarily located at or near the lower end of the shaft, the shaft 30 tends to deflect under the lateral loads imposed upon its lower end, and as a result, as indicated hereinbefore, the oil which is provided for the packing at the stuffing box is lost, as the oil runs down along the deflecting shaft. This condition is remedied by the present invention.

According to the present invention, a third bearing, which may be a sleeve bearing of bronze, brass, impregnated Teflon, or other suitable material, is provided below the level of the point of entry of the impeller shaft 30 into the tank 10. As seen in FIGS. 1 and 2, the shaft 30 enters the tank 10 through a circular opening in the mounting flange 14 and through the tank nozzle 11. In accordance with the present invention, the conventional stuffing box is replaced with a cylindrical housing 36 which extends down through the mounting flange 14 and is secured thereto, as by welding. The upper part of the housing 36 functions as the stuffing box. The lower part of the housing 36 functions as the housing for the third or sleeve bearing 40. The split gland 41 retains the packing 37 in the upper or stuffing-box portion of the housing 36. A pin 42 secures the sleeve bearing 40 to the housing 36, thereby fixing the bearing 40 against rotation.

Mounted on the shaft 30 below the housing 36 is a cup-like oil reservoir 44 for supplying lubrication to the bearing 40. Reservoir 44 is secured in position on the shaft 30, as by a dog-point set screw 45. An annular deflector baffle 46 may be used where the radial distance between the reservoir 44 and the tank nozzle 11 is large enough to require it. The deflector baffle 46, where used, is secured to the undersurface of the mounting flange 14 and surrounds the reservoir 44, being concentric therewith.

A through passage 38 is provided in the housing 36 and extends vertically from its upper edge downwardly, communicating at its lower end with the interior of the cup-like oil reservoir 44. This passage 38 functions as the oil fill for the reservoir 44. A removable plug closes the passage at the top.

Bearing 40 is provided with a plurality of radial holes (for example, four holes at 90° spacing), two of which, holes 61 and 62, are visible in FIG. 2. These holes communicate with an annular slot 63. Extending laterally through the wall of the housing 36 below the mounting flange 14, and communicating with the annular slot 63 by way of at least one of the radial holes 61, 62, is at least one lateral slot 49, the function of which is to equalize the pressure on the oil supply in the reservoir 44, and on the bearing lubrication. Such pressure-equalizing passage is made necessary by the fact that mixer tanks are frequently operated under high pressure, for the purpose, for example, of maintaining the liquid in the tank in liquid phase.

The packing 37 in the upper or stuffing box portion of the housing 36 is supported on the upper surface of the bearing 40. The packing is divided into an upper portion and a lower portion by an annular divider 51. Divider 51 is provided with an inner annular slot 52 and an outer annular slot 53, connected together by at least one radial slot 54. A radial passage 47 is provided through the wall of the housing 36 and communicates with the annular slot 52. Passage 47 connects through a removable connection 55 to a supply of oil for supplying lubrication to the packing 37. When the connection 55 is removed a plug may close the passage 47.

To provide for alignment of the three bearing assemblies 25, 28, and 40, one or more alignment holes are drilled through the foot 71 of the drive housing 15 and into the mounting flange 14, and an alignment pin 72 inserted thereinto. The holes in the foot 71 for receiving the bolts 73 are made sufficiently large in diameter to accommodate to the alignment needs.

While the preferred embodiment of this invention has been described in some detail, it will be obvious to one skilled in the art that various modifications may be made without departing from the invention as hereinafter claimed.

What is claimed is:
1. In a mixer tank:
 (a) a drive housing and means for supporting said drive housing on said tank;
 (b) a vertical impeller shaft supported in said housing and extending down into said tank;
 (c) drive means supported in said housing for driving said shaft rotationally;
 (d) spaced-apart bearing means supported in said housing above said tank for providing support against radial loads on said shaft;
 (e) stuffing box means embracing said shaft below said bearing means;
 (f) additional bearing means below said stuffing box means for providing additional support against radial loads.

2. Apparatus according to claim 1 characterized in that:
 (a) lubrication reservoir means are provided for said additional bearing means.

3. Apparatus according to claim 2 characterized in that said additional bearing means includes:
 (a) a sleeve bearing embracing said shaft.

4. Apparatus according to claim 3 characterized in that:
 (a) said stuffing box means and said additional bearing means include a common housing.

5. Apparatus according to claim 4 characterized in that:
 (a) said common housing is secured to and supported by said means which support said drive housing.

6. Apparatus according to claim 5 characterized in that said lubrication reservoir means comprises:
 (a) a cylindrical reservoir having an axial opening through which the shaft passes;
 (b) means supporting said reservoir on said shaft at the level of said additional bearing means.

7. Apparatus according to claim 6 characterized in that:
 (a) said sleeve bearing and said common housing are provided with radial passages aligned to provide communication between the interior of said tank and the interior of said sleeve bearing.

8. Apparatus according to claim 7 characterized in that:
 (a) said sleeve bearing is located within the lower portion of said common housing;
 (b) the packing of said stuffing box means is located in the upper portion of said common housing;
 (c) the packing is supported by said sleeve bearing.

9. Apparatus according to claim 8 characterized in that:
 (a) means are provided to fix said sleeve bearing to said common housing to prevent rotation of said sleeve bearing with said shaft.

10. Apparatus according to claim 9 characterized in that:
 (a) said means for supporting said drive housing on said tank includes a mounting flange,
 (b) said common housing is secured to and supported from said mounted flange.

11. Apparatus according to claim 1 characterized in that said additional bearing means includes:
 (a) a sleeve bearing embracing said shaft.

12. Apparatus according to claim 11 characterized in that:
 (a) said stuffing box means and said additional bearing means include a common housing.

References Cited
UNITED STATES PATENTS

| | | | |
|---|---|---|---|
| 2,665,122 | 1/1954 | Rowland | 259—108 |
| 2,684,273 | 7/1954 | Fears | 259—108 |
| 2,867,997 | 1/1959 | Lake | 259—108 |
| 3,291,455 | 12/1966 | Hamreus | 259—108 |

ROBERT W. JENKINS, Primary Examiner